(12) United States Patent
Sakada et al.

(10) Patent No.: US 8,645,643 B2
(45) Date of Patent: Feb. 4, 2014

(54) DATA PROCESSING CONTROL UNIT FOR CONTROLLING MULTIPLE DATA PROCESSING OPERATIONS

(75) Inventors: Oleksandr Sakada, Munich (DE); Vladimir Litovtchenko, Munich (DE)

(73) Assignee: Freescale Semiconductor, Inc., Austin, TX (US)

(*) Notice: Subject to any disclaimer, the term of this patent is extended or adjusted under 35 U.S.C. 154(b) by 668 days.

(21) Appl. No.: 12/595,362

(22) PCT Filed: Apr. 18, 2007

(86) PCT No.: PCT/IB2007/051393
§ 371 (c)(1),
(2), (4) Date: Oct. 9, 2009

(87) PCT Pub. No.: WO2008/129359
PCT Pub. Date: Oct. 30, 2008

(65) Prior Publication Data
US 2010/0058008 A1    Mar. 4, 2010

(51) Int. Cl.
*G06F 12/00* (2006.01)
*G06F 13/00* (2006.01)
*G06F 13/28* (2006.01)

(52) U.S. Cl.
USPC .......................... 711/156; 711/147

(58) Field of Classification Search
USPC .......................... 711/147, 154, 156
See application file for complete search history.

(56) References Cited

U.S. PATENT DOCUMENTS

| 5,031,180 A | 7/1991 | McIver et al. |
| 7,328,371 B1 * | 2/2008 | Kalyanasundharam et al. ................ 714/11 |

| 2002/0095547 A1 * | 7/2002 | Watanabe et al. ............. 711/114 |
| 2004/0153763 A1 * | 8/2004 | Grochowski et al. ........... 714/17 |
| 2005/0193217 A1 * | 9/2005 | Case et al. ..................... 713/200 |

FOREIGN PATENT DOCUMENTS

| JP | 54095144 A | 7/1979 |
| WO | 94/12923 A | 6/1994 |

OTHER PUBLICATIONS

A. Avizienis, "The N-Version Approach to Fault-Tolerant Software" IEEE Transactions on Software Engineering, vol. 11 Issue 12, p. 1491-1501, Dec. 1985.
International Search Report and Written Opinion correlating to PCT/IB2007/051393 dated Feb. 20, 2009.

* cited by examiner

Primary Examiner — Ryan Bertram (57) ABSTRACT

A data processing control unit for controlling two or more data processing operations SMI1,SMI2. The data processing control unit may include a control memory in control data may be stored which represents information about access to a main memory by the two or more data processing operations. A control data controller may be connected to the control memory. The control data controller may include a control data controller input or receiving an access request from one or more of the data processing operations. The control data controller may modify the data in the control memory upon receiving the access request. A process controller may be connected to the control memory. The process controller may control at least a part of the data processing operations SMI1.SMI2 based on a comparison of data in the control memory with a criterion. The process controller may include a process controller input for receiving the access request; and a process controller output for outputting a process control signal based on the comparison.

20 Claims, 3 Drawing Sheets

DATA PROCESSING CONTROL UNIT FOR CONTROLLING MULTIPLE DATA PROCESSING OPERATIONS

FIELD OF THE INVENTION

This invention relates to a data processing control unit, a method for controlling data processing operations and a data processing system.

BACKGROUND OF THE INVENTION

It is known in the art of computers to run two or more data processing operations simultaneously. For instance, A. Avizienis, "The N-version approach to fault-tolerant software", *IEEE Transactions on Software Engineering*, volume 11 issue 12, p. 1491-1501, December 1985 describes a so-called 'N-version' computer system. The computer system can run two or more computer programs (also known as 'versions' or Software Module Instances (SMI)) that have been developed independently from each other but with use of the same specification. Thus, the versions provide the same functionality but use different calculations. Thereby, the reliability of the software can be improved since the chance that the same fault occurs in more than one of the versions is relatively small. However, a disadvantage of this approach is that, although the reliability is improved compared to a single version computer program, there is still a relatively large risk of faults.

In particular, it has been found by the inventors that the reliability of a data processing operation is not only dependent on the set of instructions (i.e. the computer program) executed to perform the data processing operation, but also on the data used in the data processing operation. Accordingly, in case two or more data processing operations acquire external data or store data, there exists a chance that the data processing operations acquire differing values and/or store differing data values for the same data. In such case, since the respective data processing operations use different data values to perform the data processing operations, the outcome of the data processing operations will be different (and quite likely will be incorrect). Furthermore, in case two or more data processing operations use the same memory, there is a chance that an incorrect data value stored by one data processing operation is acquired by another data processing operation and hence there is a risk that the faults are transferred from one data processing operation to another.

SUMMARY OF THE INVENTION

The present invention provides a data processing control unit, a method for controlling data processing operations and a data processing system as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

DETAILED DESCRIPTION OF THE PREFERRED EMBODIMENTS

Figure 1:
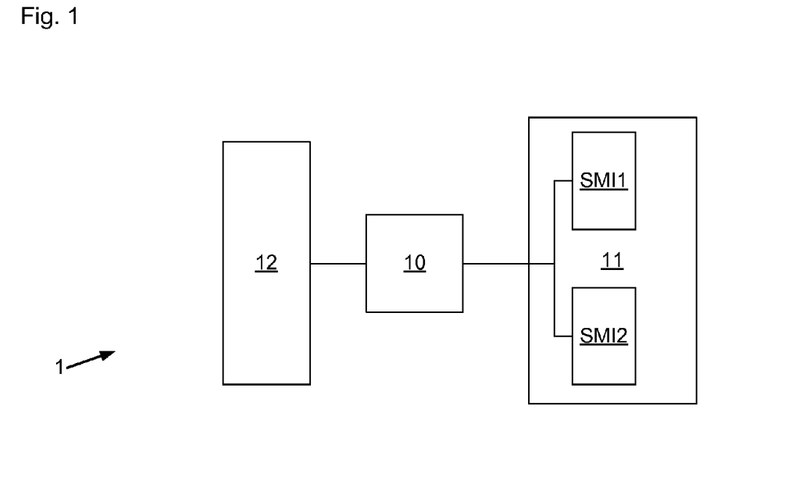
FIG. 1 shows an example of an embodiment of a data processing system.

An example of a data processing system 1 is shown in FIG. 1. The data processing system 1 may be used to perform two or more data processing operations (in FIG. 1, for sake of simplicity, two data processing operations SMI1,SMI2 are shown, however it will be apparent that the data processing system 1 may perform more than two data processing operations). The data processing system 1 may, as shown in FIG. 1 include a data processing control unit 10, one or more processors (for illustrative purposes in FIG. 1 only one processor 11 is shown) and a main memory 12. As shown in the example of FIG. 1, the data processing control unit 10 may connect the processor 11 to the main memory 12.

Figure 4:
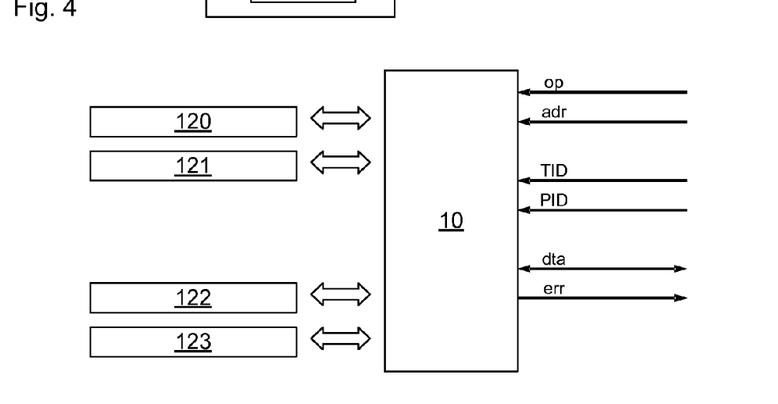
FIG. 4 shows a third example of an embodiment of a data processing control unit.

The one or more data processing operations SMI1, SMI2 may be performed by one or more of the processor(s) 11. The data processing operations may, for example, access the main memory 12 to retrieve data or to store data. The data processing operations SMI1, SMI2 may for example provide different functionalities and for instance be executed parallel in time. The data processing operations SMI1, SMI2 may for example perform different sequences of the same task and for instance form part of a parallel processing operation. As, for example, shown in FIG. 4, the data processing control unit 10 may be connectable to two or more main memories 120-123. In such case, the data processing control unit 10 may include a separate control memory 13 for each main memory 120-123 However, two or more of the main memories 120-123 may also share the same separate control memory 13.

However, the data processing operations may, for example, alternatively operate independent from each other. The two or more data processing operations SMI1,SMI2 may for instance be functionally equivalent. For example, the two or more data processing operations SMI1,SMI2 may executed by the processor(s) 11 in accordance with two or more separately developed sets of instructions. The data processing operations SMI1,SMI2 may for example be performed by the processor(s) 11 in accordance with different sets of instructions which provide the same functionality, from hereon referred to as Software Module Instances (SMI). The SMIs may for instance be developed independently from each other using the same specification, for example in accordance with the N-version approach. The processor(s) 11 may for example perform two or more SMIs and one or more of the processor (or a separate control unit) may compare the results from the different SMIs with each other to determine a correct result for the desired functionality.

The data processing operations SMI1,SMI2 may, at least partially, be executed more or less simultaneously. For instance, the data processing operations SMI1,SMI2 may be executed in an alternating manner. For instance, the processor 11 may perform a certain sequence of steps of the first data processing operation SMI1, then pause the first data processing operation SM1 and switch to the second data processing operations SMI2, perform a sequence of steps of the second data processing operation SMI2, then pause the second data processing operation SMI2, and switch back to perform a successive sequence of steps of the first data processing operation SMI1, etc. However, the data processing operations SMI1,SMI2 may also be executed simultaneously in parallel, for instance when the system 1 includes two or more processors or when the processor includes two or more processing units or processor cores. For example, a first processor or processor core may perform a sequence of steps of a first data processing operation and, at the same time, a second processor or processor core may perform a sequence of steps of a second data processing operation.

Figure 2:
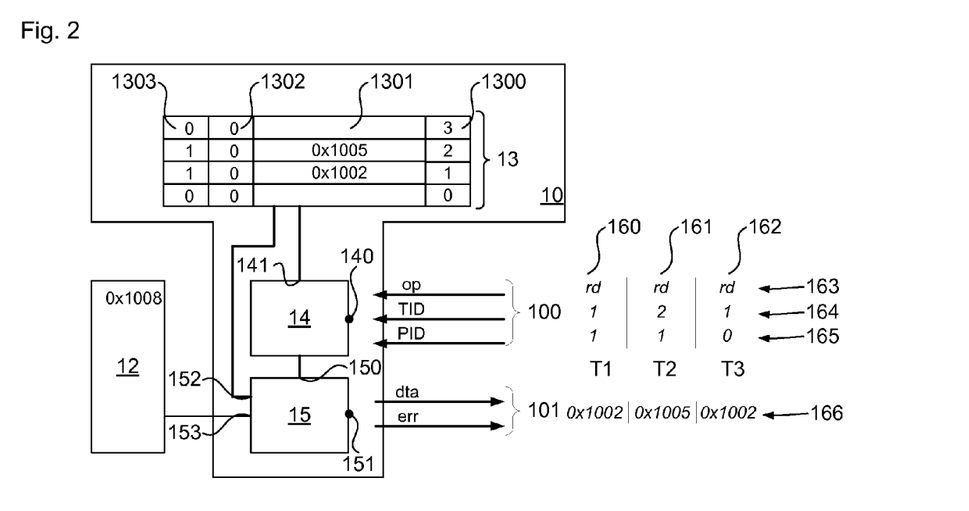
FIG. 2 shows a first example of an embodiment of a data processing control unit.
Figure 3:
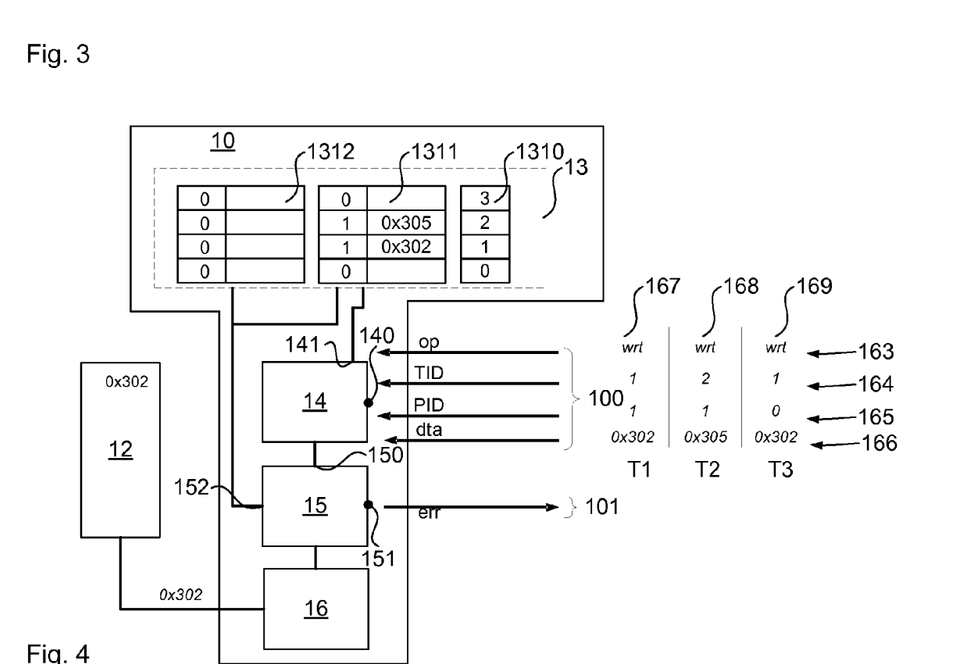
FIG. 3 shows a second example of an embodiment of a data processing control unit.

The data processing control unit 10 may control two or more of the data processing operations SMI1,SMI2. As illustrated in FIGS. 2 and 3, the data processing control unit 10 may for instance include an input 100, a control memory 13, a control data controller 14 and a processor controller 15.

The control data controller 14 may be connected to the control memory 13 and to the input 100. The control data controller 14 may for instance include a control data controller input 140 which is connected to the input 100. The control data controller 14 may for instance include a control output 141 which is connected to the control memory 13.

The process controller 15 may for example include a process controller output 151 for outputting a process control signal, to control one or more aspects of the data processing operations. The processor controller 15 may also be connected to the input 100, and for instance include a control data controller input 150 which is connected to the input 100. In the example of FIG. 2, for instance, the process controller input 150 is connected to the input 100, via the control data controller 14, and can receive the access request 160-162. However, the process controller input 150 may be connected to another component, and for instance be directly connectable to the processor 11 in order to receive the access request 160-162. The processor controller 15 may be connected to the control memory 13. The processor controller 15 may for example include a memory input 152 which is connected to the control memory 13.

In the control memory 13 control data may be stored. The control data may represent information about previous access to the main memory 12 by the two or more data processing operations SMI1,SMI2, that is access before the access request in question is received. Referring to the example of FIG. 2, for instance, data representing information about preceding access requests 160,161;167,168 may have been stored in the control memory 13 before a current access request 162, 169 is received. The control data may for example be stored in the control memory 13 by the control data controller 14.

For example, at the input 100 of the data processing control unit 10 one or more access requests 160-161 may be received from one or more of the data processing operations SMI1, SMI2. The control data controller 14 may receive, via the control data controller input 140, the access requests 160-162;167-169 and modify, in response to an access request, the control data in the control memory 13.

The process controller 15 may, as shown in FIGS. 2 and 3, be connected to the control memory 13. The process controller 15 may be connected to the input 100 of the data processing control unit 10 and for instance include a process controller input 150 which is connected to the mentioned input 100 for receiving access requests 160-162;167-169. The process controller 15 may control at least an aspect of the data processing operations SMI1,SMI2 based on a comparison of an aspect of the received access request with the control data in the control memory 13 with a predetermined criterion, and present the process control signal based on the comparison at the output 151. Thereby, the accuracy and/or reliability of the data processing operations SMI1,SMI2 may be increased. For instance, it may be prevented that the values as accessed by the different data processing operations SMI1,SMI2 are inconsistent, e.g. in case the data processing operations SMI1,SMI2 access the same data in the memory 12 at different points in time. Also, for example, incorrect access to the main memory 12 may be prevented. For example, the process controller 15 may determine, based on the comparison, identify incorrect access requests and output, at the process controller output 151, an error signal (err) in case an access request is received that is incorrect.

The data processing operations SMI1,SMI2 may request any suitable type of access and transmit any type of access request suitable for the specific implementation. For example, as illustrated in FIG. 2, the access request may for example be a read request 160-162. The control data controller 14 may then store, in the control memory 12, the values 166 of the data that have been transmitted to the requesting data processing operation. The read request 160-162 may for example include an identifier (OP) 163 of the type of request, e.g. a read request (rd), an identifier (TID) 164 of the position of the request in a sequence of requests and an identification (PID) 165 of the data processing operation from which the request originates. The control data controller 14 may receive the read request, and store in the control memory 13, for example, a data value. The data value may for instance identify whether or not a request in a predetermined sequence of access requests has been received. As for instance illustrated with the table in FIG. 2 in which a column 1300 defines a, predetermined, correct sequence of access requests, e.g. that access request types 0-3 have to be received in the sequence {0, 1, 2, 3}. The shown table includes a separate column 1302,1303 for each of the data processing operations, in which a logical '0' identifies that the request has not been received and a logical '1' identifies that the request has been received. When the access requests of the sequence have been received for all SMIs, columns 1302 and 1303 may be for instance be reset, for example automatically or upon a reset request received at the input 100.

As illustrated in FIG. 3, the access request may for example also be a write request 167-169, in which case the control data controller 14 may for instance store in the control memory 13 the values 166 of the data that the requesting data processing operation has requested to store in the main memory 12. As shown in FIG. 3, for example, in case a data processing operation SMI1,SMI2 requests write access to the main memory 12, the data processing operation SMI1,SMI2 may transmit to the control data controller 14 a write request 167-169 which includes an identifier (OP) 163 identifying the type of access, e.g. a write request (wrt), an identifier (TID) 164 of the position of the access request in a sequence of access requests that has been and/or is to be sent by the data processing operation, an identifier (TID) 165 identifying the data processing operation SMI1,SMI2 that sent the request and a value of the data (dta) 166 requested to be written in the main memory 12.

The control data controller 14 may store any suitable type of data in the control memory 13, in any suitable manner.

For instance, the control data controller 14 may store in the control memory 13 data representing the order in which access requests are received. The control data controller 14 may store in the control memory 13 data which represents the order in which access requests have been received from a respective data processing operation SMI1,SMI2, as is illustrated with the table in the memory 13. In this table the rows represent the position of a request in a series of requests and include a separate columns (e.g. columns 1302,1303 in FIG.

2) for each data processing operation SMI1,SMI2. In the control memory 13, for example a predetermined sequence of access request may be defined (in FIGS. 2 and 3, this is defined by the values in the columns 1300,1310 in FIG. 2 resp. 3 in which the order is given from bottom to top, e.g. the predetermined sequence is {0, 1, 2, 3}).

The control data controller 14 may indicate for each of the data processing operations SMI1, SMI2 which access requests in the predetermined sequence have been received. As illustrated in FIGS. 2 resp. 3, the control memory controller 14 may for example store a logic '1' at the position in the respective column of the table corresponding to the position (e.g. shown in FIG. 3 at rows 12) of a request in the predetermined sequence of requests, in order to indicate that the request at this certain position in the sequence (e.g. as defined in column 1300 in FIG. 2) has been received and a logic '0' when the request at a certain position in the sequence has not been received (yet0. As shown in FIG. 2, the data processing control unit 10 may for instance receive one or more requests from a first data processing operation SMI1, e.g. a first read request 160 or a first write request 167 at position 1 in the predetermined sequence and thereafter a second read request 161 or write request 168 at position 2 in the predetermined sequence. Thereafter, for instance, a read request 162 or a write request 169 at position 1 in the predetermined sequence is received from a second data processing operation SMI2. As shown in FIGS. 2 and 3, the control memory controller 14 may then store at corresponding positions in the table logic '0's and '1's.

As shown in FIG. 3, in case the data processing operation(s) request write access, a write request 167-169 may be received by the control data controller 14. The control data controller 14 may store in the control memory 13 data about the write request. As shown in FIG. 3, the control data controller 14 may for example store in the control memory 13 data which identifies a predetermined sequence of allowed requests, as illustrated with column 1310 (similar to the column 1300 of the table in FIG. 2). The control data controller 14 may, for instance, store in the control memory 13 information about whether or not an allowed request at a certain position in this sequence has been received, as for instance illustrated with the logic '0' and '1' in the left-hand columns of sets 1311,1312 in FIG. 3.

The control data controller 14 may store data 1301 in the control memory 13 which indicates the values of the data in the main memory 12 at the point in time the main memory 12 was accessed by the respective data processing operation SMI1,SMI2, e.g. the values that were sent to or received from the respective data processing operation to be read from or written into the main memory 12. The control data controller 14 may, for example, store in the control memory 13 information about data values read and/or written to the main memory 13 in response to one or more access requests.

For instance, as shown in the example of FIG. 2, the values sent from the main memory 12 to a data processing operation SMI1,SMI2 in response to read request may be stored in the control memory 13, e.g. the values 0x1002 and 0x1005 as have been sent in response to read requests 160,161 and the value 0x1002 as have been sent in response to read request 162. The values in the control memory 13 may then be used by the process controller 15 to control one or more aspects of the data processing operations SMI1,SMI2, as is explained below in more detail.

Also, as shown in the example of FIG. 3, the values requested to be written into the main memory 12 may be stored in the control memory 13, e.g. the values 0x302 and 0x305 as have been requested by write requests 167,168 and the value 0x302 as requested by write request 169. The values in the control memory 13 may then be used by the process controller 15 to control one or more aspects of the data processing operations SMI1,SMI2, as is explained below in more detail.

As illustrated with the tables in FIGS. 2 and 3, for instance, two or more sets of access data may be stored in the control memory 13. Each of the sets may represent information about access by a respective one of the data processing operations SMI1,SMI2. The control data controller 14 may modify data of a set for the requesting data processing operation SMI2, that is to the data processing operation from which an access request originates. The sets of data may for example include an identifier for the data processing operation to which the set relates and/or data identifying a data value accessed in the main memory and/or an identifier of the position of an received access request in an predetermined sequence of possible access requests from a data processing operations. For example, as illustrated in FIG. 3, the control memory controller 14 may maintain a separate set for each data processing operations, as shown with table 1311,1312 in FIG. 3. In the tables 1311,1312, the rows represent the position in the predetermined sequence (which sequence is defined in column 1310 in FIG. 3) and which contains in at the respective position in the table an indication of the accessed value.

The sets may for instance represent information about access to the main memory 12 by a respective one of the data processing operations SMI1,SMI2. As illustrated in FIG. 2, the sets of data may have an overlap and for example be stored in such a manner that fields of the sets are combined. For instance in the example of FIG. 2, a field indicating a predetermined sequence 1300 of the access requests and/or a field that indicates the data value that has been accessed may be combined. However, the sets of data may also be completely separate, as for example illustrated with the tables 1311,1312 in FIG. 3.

As, for example, shown in FIGS. 2 and 3, for instance, in the control memory 13 a set of data may be stored by the control memory controller 14 which corresponds to a certain stage of the data processing operations. In FIGS. 2 and 3 this is illustrated with columns 1300 and 1310, respectively. As shown in these figures, at a certain time the set consists of a sequence of requests in the range 0, 1, . . . , 3. As for instance shown in FIG. 2, at time T3 when request 162 is received, the first data processing operation SMI1 has transmitted read requests nrs. 1 and 2 (as indicated with the value '1'), but has not transmitted read request nr. 3 (as indicated with the value '0') whereas the second data processing operation SMI1 has not transmitted any of the read requests in the current set, as indicated with the logic '0' in all fields of column 1302.

The predetermined sequence may for example be changed in response to a predetermined event, such as a reception of a request by the system 10 or a given point in time, for example when all the data processing operations have transmitted the requests (e.g. types 0, 1, . . . , 3) defined in the set. For example, when the conditions for changing the predetermined sequence haven been fulfilled, the control memory controller 14 may at least erase the data in the memory 13 relating to the access requests. The control memory controller 14 may, for instance, thereafter store a new predetermined sequence in the memory 13 or update the sequence otherwise. For example, the control memory controller 14 may update the sub-set to consist (in that order) of the access requests {4,5,6,7}. The set may for example define an access window of a series of access request that are to be received, e.g. during a stage of the data processing operations. For example, the window may correspond to an operation to be executed by the data processing operations SM1,SM2 with a field of data in the main memory 12.

The process controller 15 may compare any suitable aspect of the access request with the data in the control memory 13 in any suitable manner.

For instance, in case an access request from a first data processing operation SMI1 is received, the value(s) of the data requested to be accessed may be compared by the process controller 15 with control data in the control memory 13 identifying a previous value of the data as accessed by at least one second processing operation.

The process controller 15 may for example compare a value of data requested to be accessed, by means of the access request, by at least one first processing operation with control data representing one or more data values transmitted from or to the main memory 12 in response to corresponding preceding access requests, for instance from one or more other data processing operations SMI2. As explained above, for example in the control memory 13 data representing the previous values may be stored, e.g. by the control memory controller 14. The process controller 15 may compare the requested value with this stored data. For example, the process controller 15 may compare the value requested by an access request with data in the control memory representing the values requested by one or more previous access requests which had a similar position in a predetermined sequence of requests. The processing control unit 15 may e.g. determine if another data processing operation has previously sent a similar access requests and determine from the data in the control memory 13 a suitable value to be sent to the requesting data processing operation.

As shown in the example of FIG. 2, for instance, at a time T1, a first data processing operation SMI1 may have sent a first request 160 and the control data controller 14 may have stored in the control memory that the first data processing operation SMI1 has sent the first request (as shown with the value 1 in column 1303 in FIG. 2). The first data processing operation SMI1 may have sent a second request 161 at a time T2 and the control data controller 14 may have stored in the control memory that the first data processing operation SMI1 has sent the second request (as shown with the value 1 in column 1303 in FIG. 2).

A second data processing operation SMI2 may then sent, at time T3 (with T1<T2<T3), its first request 162 and the control data controller 14 may store in the control memory that the second data processing operation SMI2 has sent the first request (by changing in column 1302 the value '0' corresponding to request type 1 into a '1'). The process controller 15 may, upon reception of the first request 162 from the second data processing operation SMI2, retrieve from the control memory 13 information about the predetermined sequence of requests, as defined in the example of FIG. 2 in column 1300 and compare the type of request with the predetermined sequence. In case, for example, the request does not fit into the predetermined sequence, for example because it is received before one or more of the prescribed preceding requests, the process controller 15 may output an error signal at the controller output 151. The error signal may for example be sent to the requesting data processing operation and in response to the error signal, the requesting data processing operation may for example enter into an error detecting phase.

As shown in the example of FIG. 3, a write request 167 from data processing operation SMI1 may have the same position in the predetermined sequence as a write request 169 from data processing operation SMI2. The process controller 15 may then compare the value (0x302) as requested to be written by write request 169 with data in the control memory 13 which represents the value (0x302) as has previously been requested to be written by write request 167, and check if the write request has not been superseded by a request that, in the predetermined sequence, follows after the received request. E.g. request 168 is of a type 2 which, as shown in column 1310, follows after the requests of type 1 and uses the same data in the main memory 12 but requests a different value '0x305', and hence has superseded the request 169. In case the write request of the same position has the same value as the value identified in the control memory 13 and the write request has not been superseded, the process controller may activate a read/write controller 16 to write the value into the main memory 12. Else, the process controller may e.g. suspend the writing until all the write requests (within the window) relating to the respective data in the main memory 12 have been received, e.g. in the example of FIG. 3, until requests 0-3 have been received from both data processing operations SMI1,SMI2.

The processing control unit 15 may also determine if the received access request corresponds to the predetermined sequence of access requests. In case an access request is received that is not listed in the column 1300 or that is received after preceding requests whereas in the predetermined sequence it is defined as being received before the preceding requests, the processing control unit 15 may present an error signal 'err' at an error output 101 of the unit 10.

The process controller 15 may e.g. have a process controller input 150 for receiving information about a predetermined sequence of access requests. For instance, as explained above, in the control memory 13 a sub-set of the total sequence of access request that can be received during the respective data processing operations may be stored. As shown in FIG. 2, for example an input 152 may be connected to the control memory 13 in which information data (as illustrated with column 1300 in FIG. 2) may be pre-stored which defines a predetermined sequence of the request from a data processing operation SMI1,SMI2. The control data controller 14 may store in the control memory 13 data identifying which requests listed in the control memory 13 have actually been received. The process controller 15 may then compare the actual order with the predetermined sequence in the control memory 13. The process controller 15 may output, for example, the error signal 'err' when the position of a received access request does not correspond to the position defined in the predetermined sequence of access requests.

Furthermore, the process controller 15 may for example determine that the access request 162 is incorrect when a difference in the position in the predetermined sequence of an access request received from a data processing operation SMI2 and of a latest access request received from another data processing operation SMI1 exceeds a threshold. Thereby, for example, the operation of the data processing operations SMI1,SMI2 may be synchronised in time. In the process controller 15 may for example be preconfigured that the lag or lead of the data processing operations SMI1,SMI2 relative to the other data processing operations SMI1,SMI2 may not exceeds a certain number of access request. Also, for example, the threshold may correspond to a difference in an upper limit and a lower limit of a window.

The data processing control unit 10 may control any suitable aspect of the data processing operations SMI1,SMI2. For example, the process controller 15 may determine, based on the comparison, whether or not an access request is correct and output, at the process controller output 151, an error signal (err) in case an access request is received that is incorrect.

Also, for instance the data processing operations SMI1, SMI2 may be controlled based on the comparison. For instance, one or more of the data processing operations may be stopped in case an unexpected type of access is requested or in case a data processing operation requests to write incorrect data in the main memory 12. Also, for instance, the data accessed by the data processing operations SMI1,SMI2 may be controlled. For instance, the process controller 15 may verify if the same data values are written or read by the data processing operations SMI1,SMI2. Thereby, the accuracy of the data used by the data processing operations SMI1,SMI2 and hence the accuracy of the data processing operations SMI1,SMI2 itself may be increased. It will be understood that the data processing control system 10 may control every access to the main memory 12. However, it is also possible that e.g. a computer system or other data processing system, accesses (e.g. read or write) the main memory 12 without passing the request through the data processing control system 10, for instance to update a status register with an appropriate value or another type of access.

The data processing control unit 10 may for instance control access to the main memory 12 by the data processing operations SMI1,SMI2. To control the access, the process controller 15 may control access to the main memory 12 by the data processing operations SMI1,SMI2. The process controller 15 may for instance compare the data in the control memory 13 with a criterion suitable to control the access. The process controller 15 may include an access control output 153 connectable to the main memory 12 for controlling the access based on the comparison. For instance, as shown in FIG. 2, the process controller 15 may, when a read access request is granted, retrieve the requested value from the main memory and transmit the retrieved value to the requesting data processing operation.

In case the process controller 15 controls the reading of data from the main memory 12, the process controller may retrieve the values of the data in the main memory 12 to which the read request relates, if the process controller 15 determines from the comparison that the request itself is correct. The process controller 15 then may, for example, retrieve from modification information in the control memory 13 the value of the data that corresponds to the type of request. For example, as shown in FIG. 2, for the first request 160 of the first data processing operation, the data may have had a first value, e.g. 0x1002, but may have been modified after the first request 160. As shown in FIG. 2, due to the modification, the second request 161 of the first data processing operation, the data may have had a second value, e.g. 0x1005, and the respective data may have been modified after the second request 161 (for instance in FIG. 2, the data has a current value of 0x1008). Thus, in case, as illustrated in FIG. 2, another data processing operation transmits a first read request, taking the present data value from the main memory 12 may cause an error. Thus, to reduce the risk of errors, the process controller 15 may determine from the modification data stored in the control memory 12 the correct data value, e.g. in this example 0x1002 and sent, as indicated in FIG. 2 with arrow 166 the determined data value 'dta' to the requesting data processing operation.

The process controller 15 may for example control the writing the requested value in the main memory 12, and for example enable writing only when the requests meets one or more write criteria. For example, in case all the write requests of the same type from the different data processing operations have requested to write the same value in the main memory 12. As shown in FIG. 3, for instance, the process controller 15 may be connected a memory read and/or write controller 16 connectable to the main memory 12. The memory read and/or write controller 16 may control data read from and/or written to the main memory based on the comparison. The memory read and/or write controller 16 may also modify data in the main memory 12 when a result of the comparison meets a predetermined write criterion and/or to output an error signal if the result does not meet the predetermined write criterion. For instance, in case a comparison is made, in response to a write request from a data processing operation, between data to be written into the main memory 12 and data stored in the control memory 13 for corresponding write requests from one or more other data processing operation, the read and/or write controller 16 may control the reading and/or writing of the data in to the main memory 12. For instance, the process controller 15 may first receive from the data processing operations SMI1,SMI2 all the write requests relating to the specific data, compare the received write request e.g. using the data stored in the control memory, determine the actual value to be written in the main memory 12 (e.g. in the example of FIG. 3 0x305), and write this value in the main memory 12 when the write requests are consistent.

Figure 5:
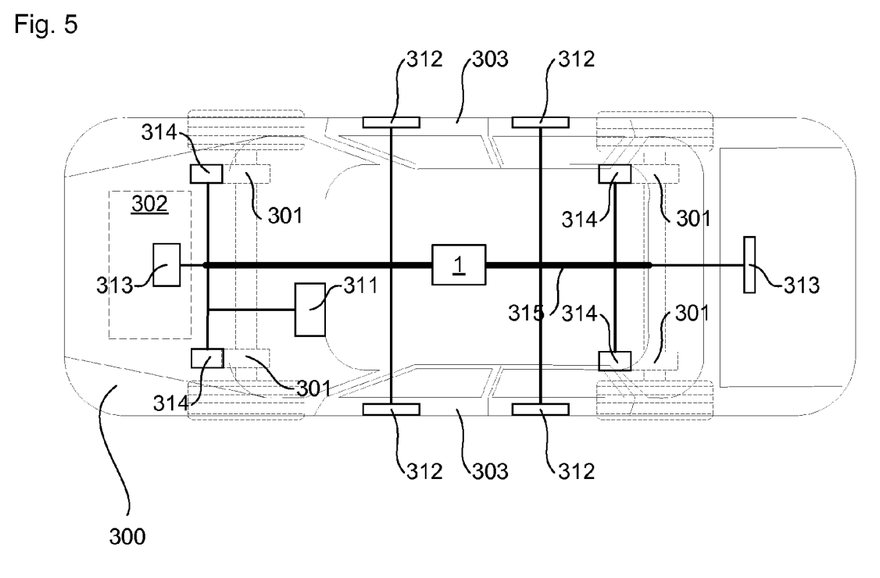
FIG. 5 shows an example of an embodiment of an apparatus in which a data processing control unit may be used.

The data processing system 1 may for example be included in an apparatus, for example, in a stationary apparatus or in a vehicle, such as a car or a plane or other type of vehicle. For instance, FIG. 5 shows an example of a vehicle 300 in which a data processing system 1 is provided. The example shown in FIG. 5 includes an engine 302. An engine control node 313 may be present which can control and monitor the engine 302. The vehicle 300 may further have break control nodes 314 which can control and monitor the breaks 301. The vehicle 300 may also have door lock control nodes 312 which can actuate the locking and unlocking of doors 303 of the vehicle 300. The nodes 312-314 may be connected to a display node 311 via a connection 315. At the display 311, for example, data can be outputted in a for humans perceptible form, for example, informing an occupant of the vehicle whether or not the doors 303 are locked and or the rotations per minute (rpm) the engine is running. The nodes 311-314 may, as shown in FIG. 5, be connected to the data processing system 1. The data processing system may, for instance, control actuators to correct the movement of the vehicle 300. The data processing system 1 may, for example, control individual brakes acting on the front wheels or the rear wheels and/or control the power of an engine, in order to correct, for example, under-steer or over-steer of the vehicle 300. The data processing system 1 may further control the actuators based on the information provided by the nodes 311-314, for example in order to prevent the vehicle 300 from slipping or otherwise correct the movement of the vehicle 300. However, the data processing system 1 may alternatively or in addition execute one or more other applications.

The invention may also be implemented in a computer program for running on a computer system, at least including code portions for performing steps of a method as claimed in the invention when run on a programmable apparatus, such as a computer system or a microprocessor, or enabling a programmable apparatus to perform functions of a device or system as claimed in the invention. For instance, the data processing control unit 10 may be implemented as a computer program product which can be run by a programmable apparatus, for instance an apparatus which executes one or more of the data processing operations SMI1,SMI2. Such a computer program may be provided on a data carrier, such as a CD-rom or diskette, stored with data representing the computer program. The data may be loadable in a memory, such as a programmable read-only memory. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the processor 11 may be a microprocessor, such as for example a central processing unit (CPU) and/or a coprocessor and/or a digital signal processor and/or an embedded processor and/or a microcontroller (μC) or other process. Also, the main memory and/or the control memory may any type of memory available in a system such as for instance a register, random access memory (RAM) e.g. static RAM or dynamic ram), cache memory or any other medium suitable to store information. Furthermore, the memory may also be implemented as a part of a memory device, and for example include a range of addresses available in the memory device. Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. For example, the data processing control unit 10 may include two or more separate semiconductor circuits, for instance the control memory 13 may be implemented on a different piece of semiconductor than the control memory controller 14 and/or the process control unit 15. Also, devices functionally forming separate devices may be integrated in a single physical device. For example, the data processing control unit 10 and the processor 11 may be implemented as a single semiconductor circuit. Furthermore, for instance, the main memory 12 and the control memory 13 may be implemented as a single memory device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the words 'a' and 'an' shall not be construed as limited to 'only one', but instead are used to mean 'at least one', and do not exclude a plurality. Also, the term 'memory' includes any medium suitable to store information.

The invention claimed is:

1. A data processing control unit for controlling at least two data processing operations, including a first operation and second operation, said data processing control unit including:
a control memory for storing a first control data based upon a first access request from the first operation that includes information indicative of a position identifier that indicates that the first access request as an access request from the first operation and information that indicates a position of the first access request in a sequence of access requests that is predefined to be generated by each of the first operation and the second operation, and that includes the first access request;
an input for receiving the first access request from the second operation to access data in a main memory;
a control data controller connected to said control memory and said input, which control data controller is configured to store data about access requests of the sequence of access requests, including the first control data, in said control memory; and
a process controller connected to said control memory and to said input, to provide a process control signal at an output to control at least an aspect of said second operation based on a comparison of the first access request from the second operation to the first control data.

2. A data processing control unit as claimed in claim 1, wherein said process controller is configured to compare a value of data requested to be accessed, by said first access request, by the one of said data processing operations with control data representing a previous value of said data as accessed by the another of said data processing operations.

3. A data processing control unit as claimed in claim 1, wherein said process controller is configured to compare said data in said control memory with a criterion suitable to control access to said main memory by said data processing operations, and wherein said process controller includes an access control output connectable to said main memory for controlling said access based on said comparison.

4. A data processing control unit as claimed in claim 3, further including a memory read and/or write controller connected to said process controller and to an output of said data processing control unit, said output being connectable to said main memory, for controlling data read from and/or written to said main memory based on said comparison.

5. A data processing control unit as claimed in claim 4, wherein said process controller is configured:
to compare, in response to the first access request being a write request from a one of said data processing operations, a value of data to be written into said main memory by the first access request from the one of said data processing operations with a value of data stored in said control memory for the first access request from an another of said data processing operations, and
to activate a data modifying operation of said memory read and/or write controller when a result of said comparison meets a predetermined write criterion, said data modifying operation including modifying data in the main memory, and/or
to output an error signal if said result does not meet said predetermined write criterion.

6. A data processing control unit as claimed in claim 4, wherein said memory read and/or write controller is further configured to modify the data in the main memory when corresponding write requests have been received from a preselected part of said data processing operations.

7. A data processing control unit as claimed in claim 1, wherein said data processing control unit is configured to control the proceeding of said data processing operations, and wherein said process controller includes an operation controller output for outputting an operation control signal to at least one of the data processing operations when said comparison meets a predetermined criterion.

8. A data processing control unit as claimed in claim 7, wherein said process controller is configured to determine if a one of said data processing operations has transmitted all the access requests in said common sequence and hold said one of said data processing operations until another of said data processing operations has transmitted all the access requests in said common sequence.

9. A data processing control unit as claimed in claim 1, wherein said process controller is configured to determine, based on said comparison, whether or not an access request is correct and to output, at said process controller output, an error signal in case an access request is received that is incorrect.

10. A data processor comprising:
a control memory;
a data memory;
an input to receive a sequence of access requests from a plurality of data processing operations, including a first data processing operation and a second data processing operation, the sequence of access requests is predefined to be generated by each one of the plurality of data processing operations;
a control data controller connected to the input and to the control memory to store control data at said control memory for received access requests of the sequence of access requests, the control data for a particular access request to indicate which of the plurality of data processing operations generated the particular access request and to indicate a position of the particular access request within the sequence of access requests; and
a process controller connected to the control memory and to the input to provide a process control signal at an output to control at least an aspect of a particular data processing operation of the plurality of data processing operations, the process control signal based upon a comparison of a current access request from the particular data processing operation to first control data stored at the control memory, the first control data identifiable as corresponding to an access request by a different data processing operation than the current access request, and the first control data identifiable as corresponding to the a access request within the sequence of access requests as the current access request.

11. A data processor as claimed in claim 10, wherein the first control data includes access data from a previous access request, and the comparison of the current access request to the first control data includes comparing the access data from the previous access request to access data of the current access request.

12. A data processor as claimed in claim 11, wherein the access data is data read from the data memory.

13. A data processor as claimed in claim 11, wherein the access data is data written to the data memory.

14. A data processor as claimed in claim 10, wherein the control data controller stores control data for the current access request in the control memory that indicates an order in which the current access request was received at the input.

15. A data processor as claimed in claim 14, wherein the control data includes an indication that is provided as at least part of the process control signal to indicate that the current access request is incorrect based upon a difference between the indicated order and an indication of a position of the current access request within the sequence of access requests stored at the control memory.

16. A data processor as claimed in claim 14, further comprising providing an indication on the process control signal that indicates that the current access request is incorrect in response to the indication of the order not being equal to an indication of a position of the current access request within the sequence of access requests stored at the control memory.

17. A data processor as claimed in claim 14 further comprising providing an indication on the process control signal that indicates that the current access request is incorrect in response to information about the current access request not being present in the control memory.

18. A data processor as claimed in claim 10, wherein a plurality of sets of control data are stored in the control memory, each of the sets representing control data for access requests corresponding to a respective one of the plurality of data processing operations, and the control data controller is configured to modify control data of a set corresponding to the particular data processing operation.

19. A data processor as claimed in claim 10, wherein in response to the comparison not meeting a criteria, the process controller prevents the current access request from being completed.

20. A data processor as claimed in claim 10, further comprising a read and/or write controller; wherein the process controller compares the current access request with data in the control memory and in response to the comparison instructs the read and/or write controller to complete the current access request.

* * * * *